(12) United States Patent
Mauricio

(10) Patent No.: US 12,481,148 B2
(45) Date of Patent: Nov. 25, 2025

(54) OPTICAL SIGHT

(71) Applicant: Trijicon, Inc., Wixom, MI (US)

(72) Inventor: Jeremiah Mauricio, Tecumseh, MI (US)

(73) Assignee: Trijicon, Inc., Wixom, MI (US)

( * ) Notice: Subject to any disclaimer, the term of this patent is extended or adjusted under 35 U.S.C. 154(b) by 561 days.

(21) Appl. No.: 17/545,382

(22) Filed: Dec. 8, 2021

(65) Prior Publication Data

US 2023/0176358 A1 Jun. 8, 2023

(51) Int. Cl.
| | | |
|---|---|---|
| *G02B 23/10* | (2006.01) | |
| *F41G 1/38* | (2006.01) | |
| *G02B 15/10* | (2006.01) | |
| *G02B 27/36* | (2006.01) | |

(52) U.S. Cl.
CPC .............. *G02B 23/105* (2013.01); *F41G 1/38* (2013.01); *G02B 15/10* (2013.01); *G02B 27/36* (2013.01)

(58) Field of Classification Search
CPC .......... G02B 27/106; G02B 7/09; G02B 7/04; G02B 27/32; G02B 27/36; G02B 27/34
See application file for complete search history.

(56) References Cited

U.S. PATENT DOCUMENTS

| | | | |
|---|---|---|---|
| 4,531,052 A | 7/1985 | Moore | |
| 5,171,933 A | 12/1992 | Eldering | |
| 5,276,554 A | 1/1994 | Nassivera | |
| 5,619,031 A * | 4/1997 | Choate | G02B 27/34 |
| | | | 348/136 |
| 7,624,528 B1 | 12/2009 | Bell et al. | |
| 7,905,046 B2 | 3/2011 | Smith, III | |
| 9,062,961 B2 | 6/2015 | Chen et al. | |
| 9,310,165 B2 | 4/2016 | Bell et al. | |
| 9,323,061 B2 | 4/2016 | Edwards et al. | |
| 9,383,166 B2 | 7/2016 | Jahromi | |
| 9,389,425 B2 | 7/2016 | Edwards et al. | |
| 9,494,787 B1 | 11/2016 | Bagwell | |
| 2012/0105951 A1 * | 5/2012 | Lim | G02B 7/10 |
| | | | 359/422 |
| 2012/0298750 A1 | 11/2012 | McCarty et al. | |
| 2012/0314283 A1 | 12/2012 | Jahromi | |
| 2013/0033746 A1 | 2/2013 | Brumfield | |
| 2013/0170027 A1 | 7/2013 | Peters et al. | |
| 2015/0130950 A1 | 5/2015 | Bacarella et al. | |
| 2019/0072364 A1 | 3/2019 | VanBecelaere et al. | |
| 2021/0123705 A1 * | 4/2021 | Gallery | G02B 23/145 |
| 2022/0364827 A1 * | 11/2022 | Mauricio | F41G 1/473 |

OTHER PUBLICATIONS

Extended European Search Report issued in corresponding European Patent Application No. 22210315.2 dated Apr. 24, 2023 (7 Pages).

* cited by examiner

*Primary Examiner* — Sharrief I Broome
*Assistant Examiner* — Journey F Sumlar
(74) *Attorney, Agent, or Firm* — Harness, Dickey & Pierce, P.L.C.

(57) ABSTRACT

An optical sight includes a lens assembly, a digital reticle display, a magnification adjuster, and a controller. The magnification adjuster is configured to be adjusted by a user. The controller is configured to display a reticle on the digital reticle display based on a real-time magnification, and is configured to determine the real-time magnification based on a position of the magnification adjuster.

19 Claims, 10 Drawing Sheets

OPTICAL SIGHT

FIELD

The present disclosure relates to an optical sight, and more specifically, to an optical sight replicating a first focal plane reticle with a second focal plane disturbed reticle.

BACKGROUND

This section provides background information related to the present disclosure which is not necessarily prior art.

An optical sight includes at least one lens. A focal length of the optic is measured as the distance between the lens and a focal point. A convex lens creates a positive focal length, while a concave lens creates a negative focal length. Thus, when the optical sight includes an objective lens assembly, a relay assembly, and an eyepiece, the optical sight also includes an objective focal length, a relay focal length, and an eyepiece focal length. The overall focal length of the optical sight is the sum of the focal lengths of the sub systems.

A plane through the focal point and along an axis through the lens is the focal plane. In a first focal plane, the reticle subtends throughout the magnification range. In a second focal plane, the reticle remains constant throughout the magnification range. In a see-through day optic, the reticle is illuminated or obscures on a lens of the optic and may or may not be magnified with magnification of the optic. In a digital optic, the reticle is generally displayed to match magnification with the target image displayed.

SUMMARY

This section provides a general summary of the disclosure, and is not a comprehensive disclosure of its full scope or all of its features.

An example optical sight of the present disclosure includes a lens assembly, a digital reticle display, a magnification adjuster, and a controller. The magnification adjuster is configured to be adjusted by a user. The controller is configured to display a reticle on the digital reticle display based on a real-time magnification, and is configured to determine the real-time magnification based on a position of the magnification adjuster.

The reticle may include a primary aiming point and a secondary aiming point.

The controller may be configured to control a magnification of the primary aiming point to correspond to the real-time magnification.

The controller may be configured to control a magnification of the secondary aiming point to remain constant.

The controller may be configured to control a magnification of the secondary aiming point to correspond to the real-time magnification.

The controller may be configured to control a magnification of the primary aiming point to remain constant.

The controller may be configured to control a magnification of the secondary aiming point to remain constant.

The controller may be configured to control a magnification of the secondary aiming point to correspond to the real-time magnification.

The primary aiming point may include a horizontal crosshair and a vertical crosshair and the secondary aiming point is a circular aiming point.

The magnification adjuster may be an adjustment ring, at least one button, or a dial.

An example method for adjusting a reticle display according to the present disclosure includes: detecting, by a controller, movement of a magnification adjuster; determining, by the controller, a real-time magnification from the detecting the movement of the magnification adjuster; determining, by the controller, a magnification of a reticle based on the real-time magnification; and displaying the reticle on a digital display.

The reticle may include a primary aiming point and a secondary aiming point.

The example method may further include controlling, by the controller, a magnification of the primary aiming point to correspond to the real-time magnification.

The example method may further include controlling, by the controller, a magnification of the secondary aiming point to remain constant.

The example method may further include controlling, by the controller, a magnification of the secondary aiming point to correspond to the real-time magnification.

The example method may further include controlling, by the controller, a magnification of the primary aiming point to remain constant.

The example method may further include controlling, by the controller, a magnification of the secondary aiming point to remain constant.

The example method may further include controlling, by the controller, a magnification of the secondary aiming point to correspond to the real-time magnification.

The magnification adjuster may be an adjustment ring, at least one button, or a dial.

The determining the real-time magnification may include determining a real-time position of the magnification adjuster and determining the real-time magnification based on the real-time position of the magnification adjuster.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
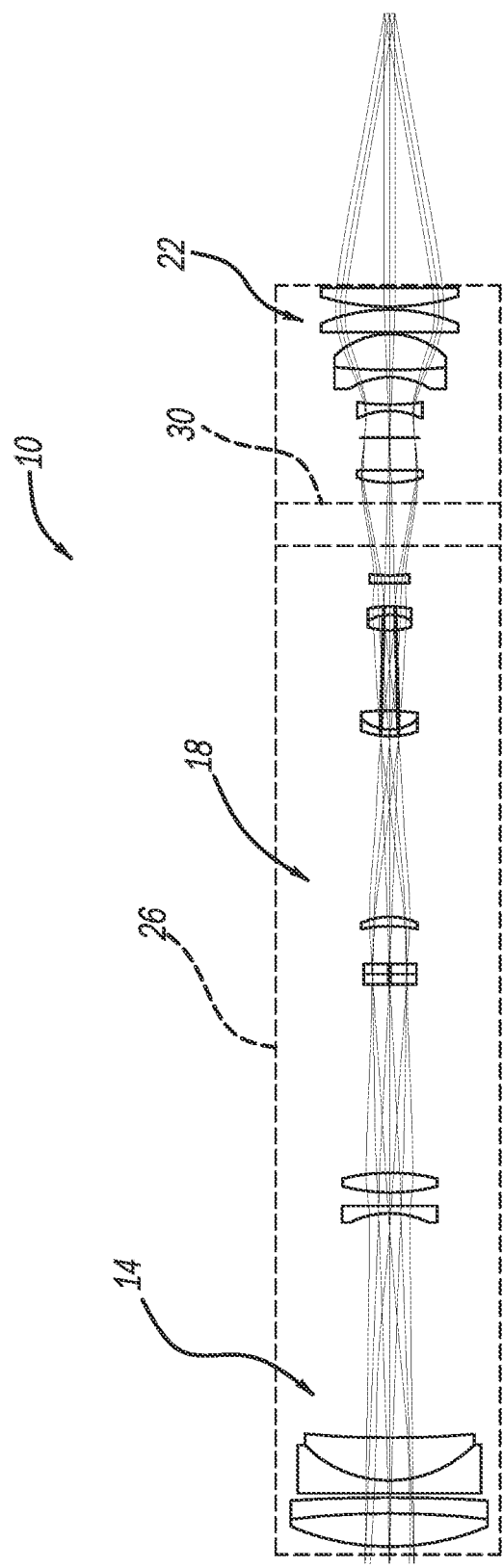
FIG. 1 is a schematic illustration of an example optical sight according to the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Referring to FIG. 1, an optical sight 10 may include one or more lens assemblies, including, for example, an objective lens assembly 14, a relay lens assembly 18, an ocular lens assembly 22, or a combination of these. The objective lens assembly 14, the relay lens assembly 18, and the ocular lens assembly 22 may be supported within a housing 26.

The objective lens assembly 14 may include one or more convex lenses, one or more concave lenses, or a combination of these. The objective lens assembly 14 may be a telephoto objective and may be disposed generally proximate to an end of the optical sight 10. For example, the objective lens assembly 14 may include a convex-plano doublet lens having a substantially doublet-convex lens and a substantially concave-convex lens secured together by a suitable adhesive and a convex-plano singlet lens. Alternatively, the objective lens assembly 14 may include any suitable combination of lenses.

The relay lens assembly 18 may include one or more convex lenses, one or more concave lenses, or a combination of these. The relay lens assembly 18 may be disposed between the objective lens assembly 14 and the ocular lens assembly 22. The lenses of the relay lens assembly 18 may move relative to the housing 26, the objective lens assembly 14, and the ocular lens assembly 22, to adjust a magnification of the optical sight 10. Movement of the relay lens assembly 18 may be controlled by an adjustment ring 30 on the housing 26, by a user input, such as buttons, on the housing 26, a dial on the housing 26, or in any other manner.

The ocular lens assembly 22 may include one or more convex lenses, one or more concave lenses, or a combination of these. The ocular lens assembly 22 may be disposed generally on an opposite end of the optical sight 10 from the objective lens assembly 14 and may include an eyepiece lens, which may be of a bi-convex singlet or substantially doublet-convex type lens, and a doublet ocular lens. The doublet-convex type lens may include a substantially doublet-convex lens and a substantially doublet-concave lens secured together by a suitable adhesive. Alternatively, the ocular lens assembly 22 may include any suitable combination of lenses.

Figure 2A:
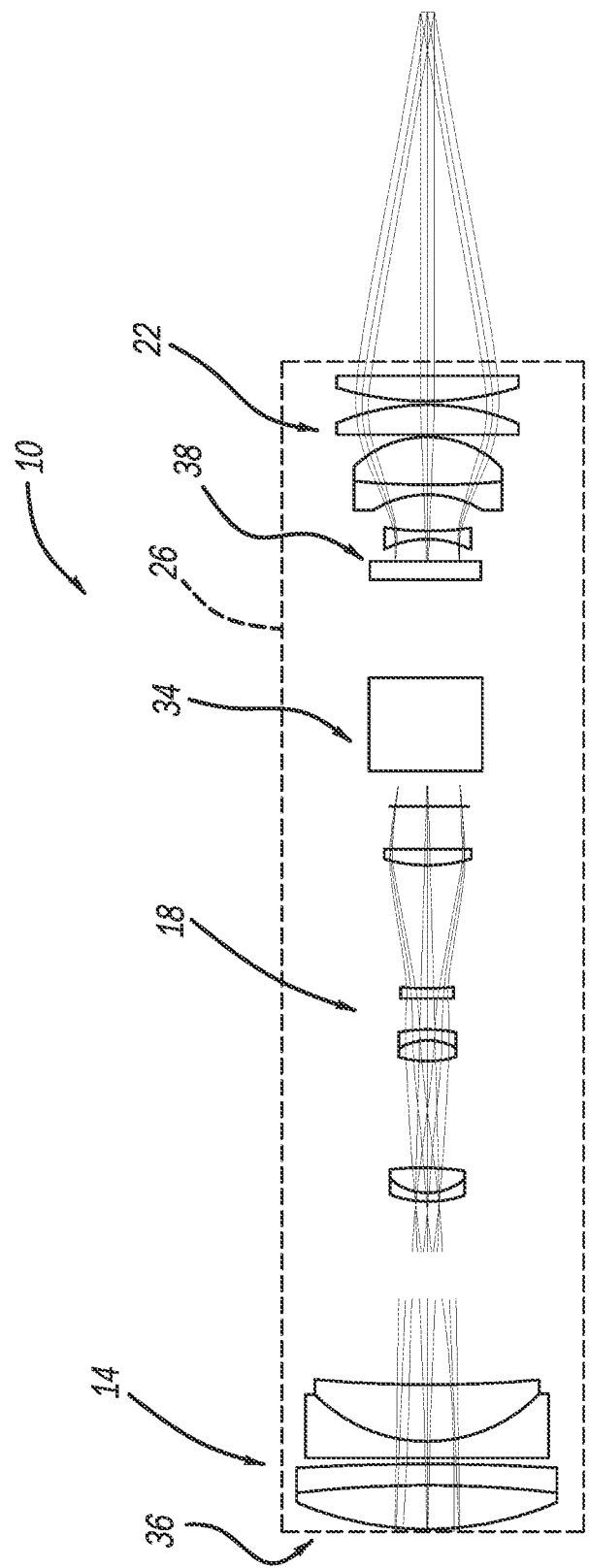
FIG. 2A is a schematic illustration of another example optical sight according to the present disclosure.
Figure 2B:
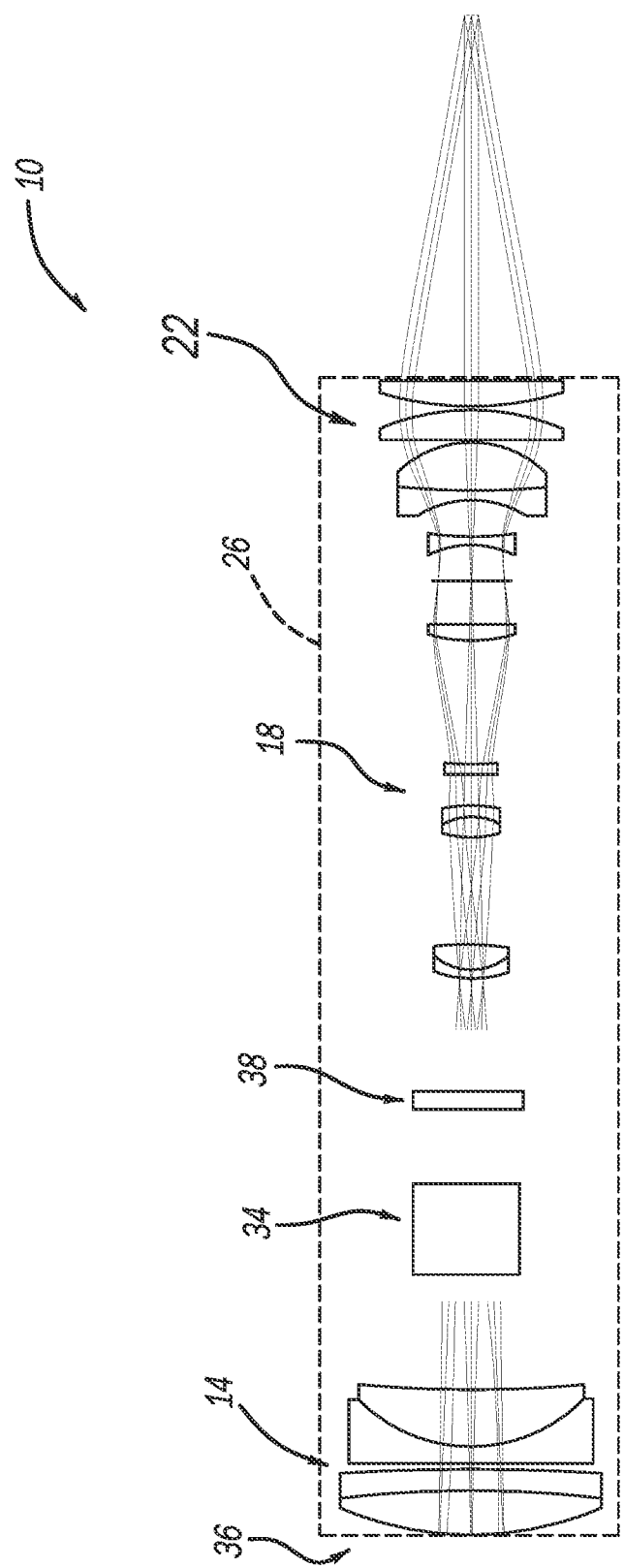
FIG. 2B is a schematic illustration of another example optical sight according to the present disclosure.

Referring to FIGS. 2A and 2B, the optical sight 10 may additionally include a camera 34 in place of, or in addition to the relay lens assembly 18. The camera 34 may be positioned adjacent the objective lens assembly 14 and/or adjacent the relay lens assembly 18. The camera 34 may capture digital video images of a target scene that are processed and provided to the user. The target scene may be a scene captured through an opening 36 in the end of the housing 26 adjacent the objective lens assembly 14. The images may be continuously captured by the camera 34 and streamed to the user through a display 38, such as a digital display, positioned adjacent the ocular lens assembly 22.

For example, light from the target scene may enter the opening 36 in the end of the housing 26, may pass through the objective lens assembly 14 and the relay lens assembly 18, and may be captured by the camera 34 (FIG. 2A). Alternatively, light from the target scene may enter the opening 36, may pass through the objective lens assembly 14, and may be capture by the camera 34 (FIG. 2B). The images may then be processed by the camera 34 or a controller (described below) and/or provided to the display 38. For example, the images may be zoomed images of the target scene provided by optical zoom and/or digital zoom features of the camera 34.

The camera 34 may be one of various types of cameras. The camera may include a camera sensor, or may be a camera sensor, that detects various wavelengths of light. For example, the camera 34 may capture images of visible light, infrared spectrum wavelengths, thermal spectrum wavelengths, hyperspectral wavelengths, and/or another type of camera as may be appropriate in applications. Thus, high resolution digital images, infrared images, thermal images, and/or other types of images of any desired spectra may be captured.

The display 38 may be one of various types of displays, such as a digital display. For example, the display may include a screen, such as a liquid crystal display (LCD) screen, or other display screen. The display 38 may receive processed zoomed images of the target scene from the camera 34. Thus, the display 38 may provide high resolution digital images, infrared images, thermal images, and/or other types of images of any desired spectra to the user.

Figure 3:
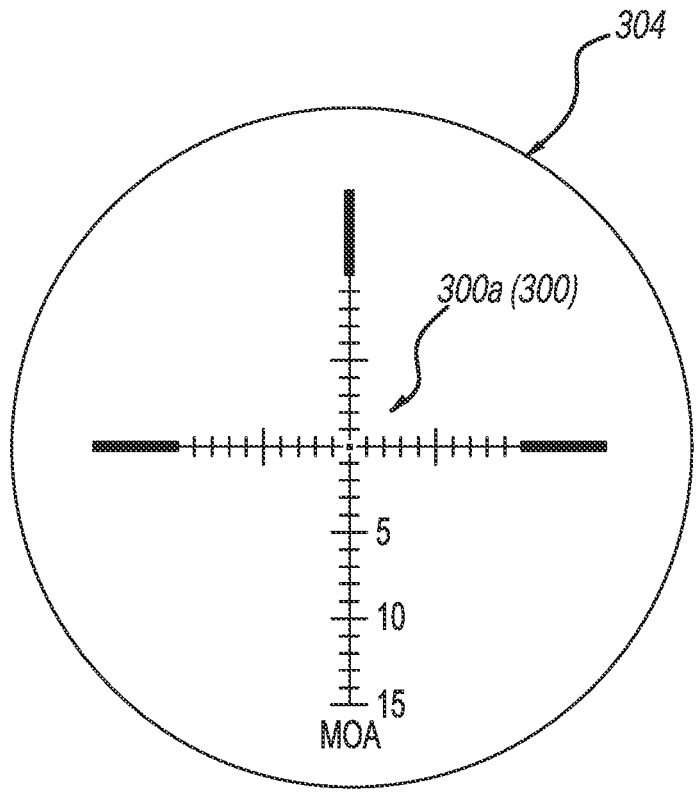
FIG. 3 is a schematic illustration of a reticle displayed in the optical sight of FIG. 1, FIG. 2A, or FIG. 2B.
Figure 4:
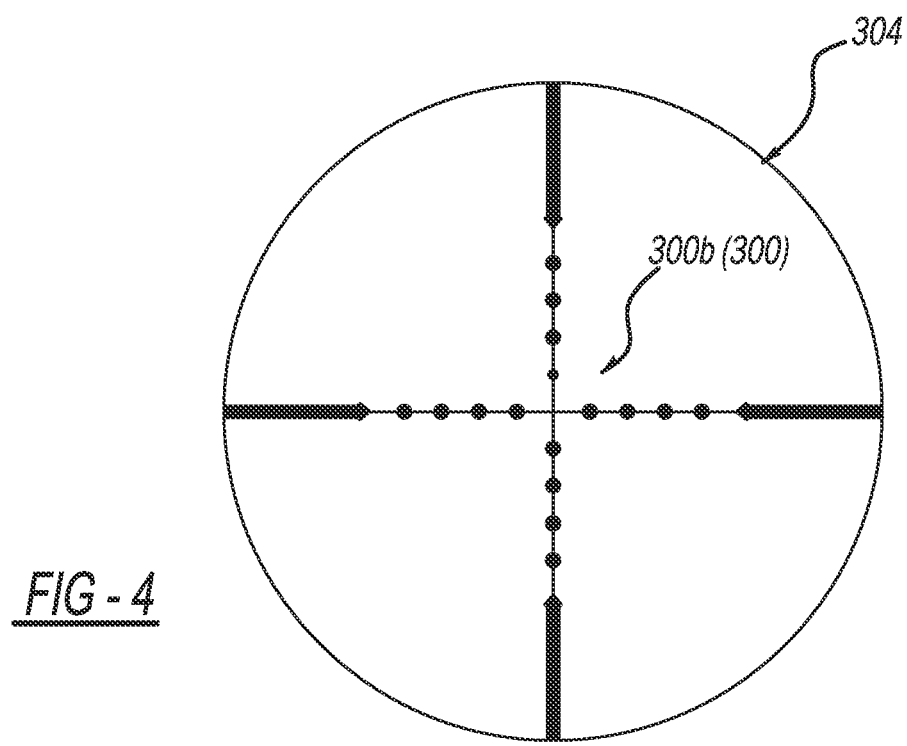
FIG. 4 is a schematic illustration of a reticle displayed in the optical sight of FIG. 1, FIG. 2A, or FIG. 2B.

Referring to FIGS. 3 and 4, a reticle 300 (300*a*, 300*b*) may be displayed on a lens 304 before or after the relay lens assembly 18 or on the display 38. The relay lens assembly 18 is used to adjust a position of the reticle 300 when zeroing the optical sight 10 or when adjusting a position of the reticle 300 to account for environmental conditions. The relay lens assembly 18 may be carried by a main tube disposed within a housing of the optical sight 10 and may be moved along with the main tube relative to the housing of the optical sight by pivoting the main tube about a pivot point.

Alternatively, the reticle 300 (300*a*, 300*b*) may be displayed by the display 38, as previously described. The display 38 or a controller (described below) may adjust a position of the reticle 300 to zero the sight, account for environmental conditions, account for an estimated ballistic drop and/or range, provide a primary aiming point and a secondary, or refined, aiming point, etc. The display 38 may provide a digital image of the reticle 300 on the display screen, along with a digital image of the target.

As shown in FIG. 3, the reticle 300 may be a minute-of-angle (MOA) reticle 300*a*, for example, where at a distance of 100 yards, the distance between the dashes represents a height of 1.047 inches on a target. Alternatively, for example, the reticle 300 may be a milliradian (MILS) reticle 300*b*, as shown in FIG. 4. In the MILS reticle 300*b*, at 100 yards, the distance between the dots represents a height of 3.6 inches on a target.

Figure 5:
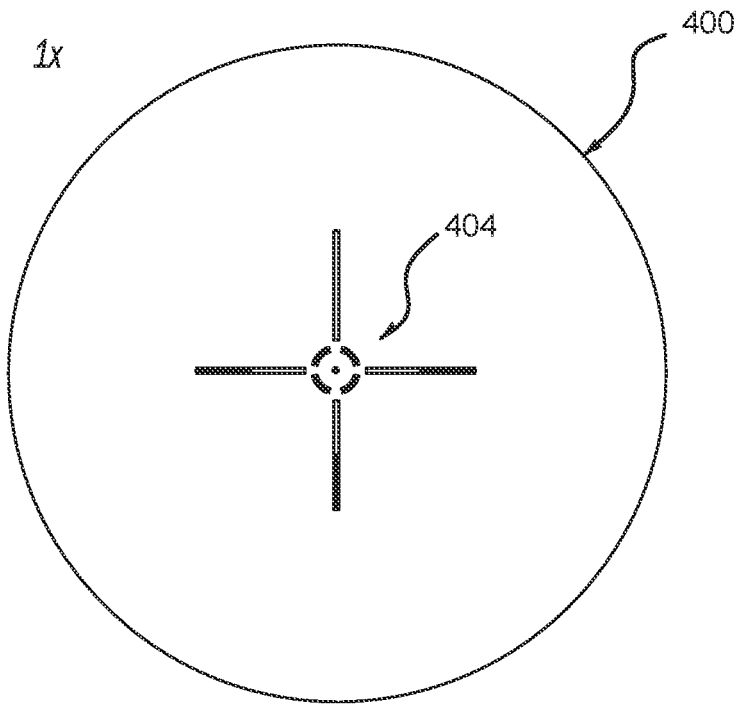
FIG. 5 is a schematic illustration of a reticle displayed in the optical sight of FIG. 1, FIG. 2A, or FIG. 2B.
Figure 6:
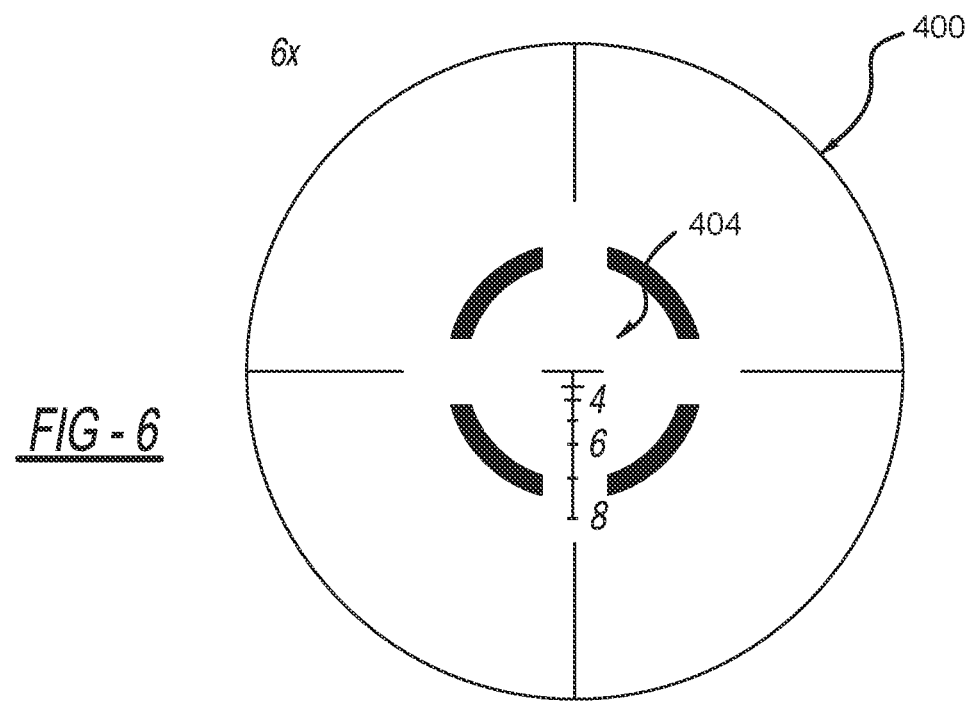
FIG. 6 is a schematic illustration of a reticle displayed in the optical sight of FIG. 1, FIG. 2A, or FIG. 2B.

As shown in FIGS. 5 and 6, a first focal plane display 400 includes reticle 404 that zooms in or out based on the magnification, such that the reticle 404 subtends throughout the magnification range. In FIG. 5, the display 400 is shown at a low magnification (for example, 1× magnification). The reticle 404 at low magnification may appear very small and thin, making it difficult to read and utilize. In FIG. 6, the display 400 is shown at high magnification (for example, 6× magnification). The reticle 40 at high magnification may appear very large and can overlap or obscure the target, making the target difficult to see.

Figure 7:
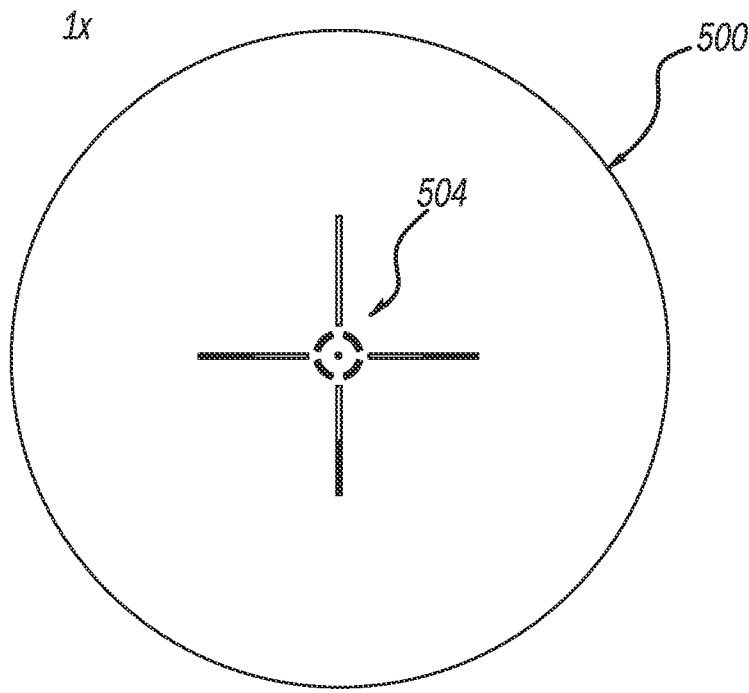
FIG. 7 is a schematic illustration of a reticle displayed in the optical sight of FIG. 1, FIG. 2A, or FIG. 2B.
Figure 8:
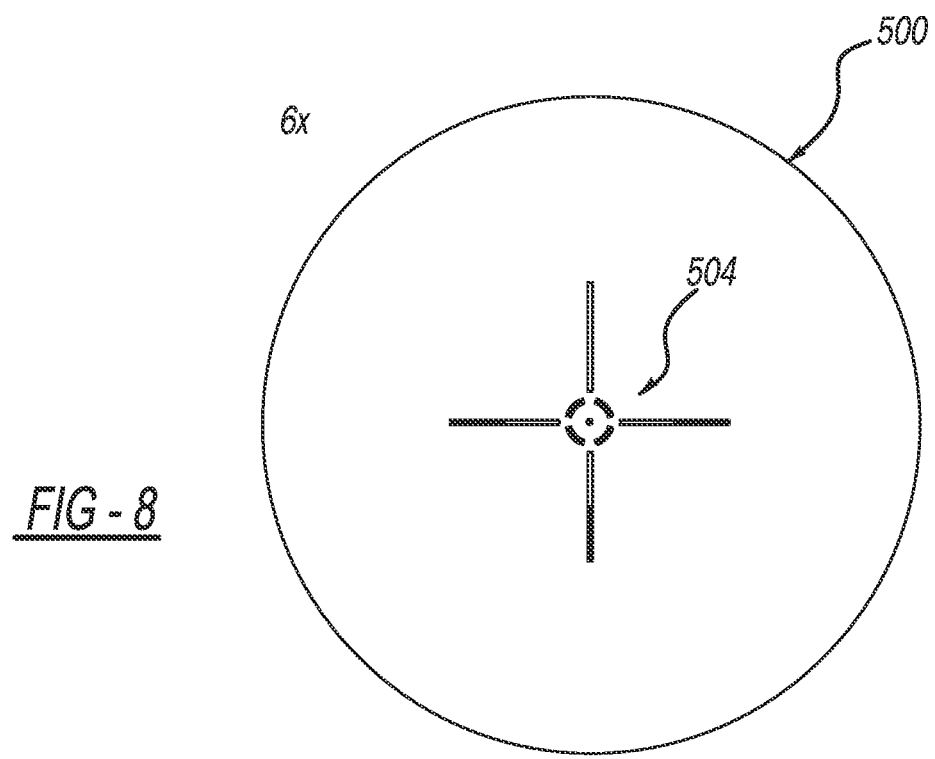
FIG. 8 is a schematic illustration of a reticle displayed in the optical sight of FIG. 1, FIG. 2A, or FIG. 2B.

As shown in FIGS. 7 and 8, a second focal plane display 500 includes reticle 504 that remains constant as the magnification increases and decreases. In FIG. 7, the display 500 is shown at low magnification (for example, 1× magnification). In FIG. 8, the display 500 is shown at high magnification (for example, 6× magnification). Because the reticle 504 remains constant throughout the magnification range, the reticle 504 may need unique ballistic drop estimates at each specified setting.

Figure 9:
FIG. 9 is a picture of a display of the optical sight in FIG. 1, FIG. 2A, or FIG. 2B.

Now referring to FIG. 9, the optical sight 10 may integrate a disturbed reticle 600 into the variable power system. A first focal plane reticle may be replicated by a second focal plane disturbed reticle. The disturbed reticle 600 may provide one or two aiming points on the sight. A primary aiming point 604 is on boresight, or is a central aiming point of the reticle 600. The primary aiming point 604 may be defined by an intersection between a primary vertical crosshair 608 and a primary horizontal crosshair 612. The primary aiming point 604 is often used to initially track the target and obtain range and ballistic drop. After completing the calculations for range and ballistic drip, a secondary aiming point 616 is displayed to indicate the estimated bullet-impact point. The secondary aiming point 616 may consider environmental conditions, estimated range, estimated ballistic drop, etc. The secondary aiming point 616 is used to refine the weapon operator's aim before firing.

Figure 10:
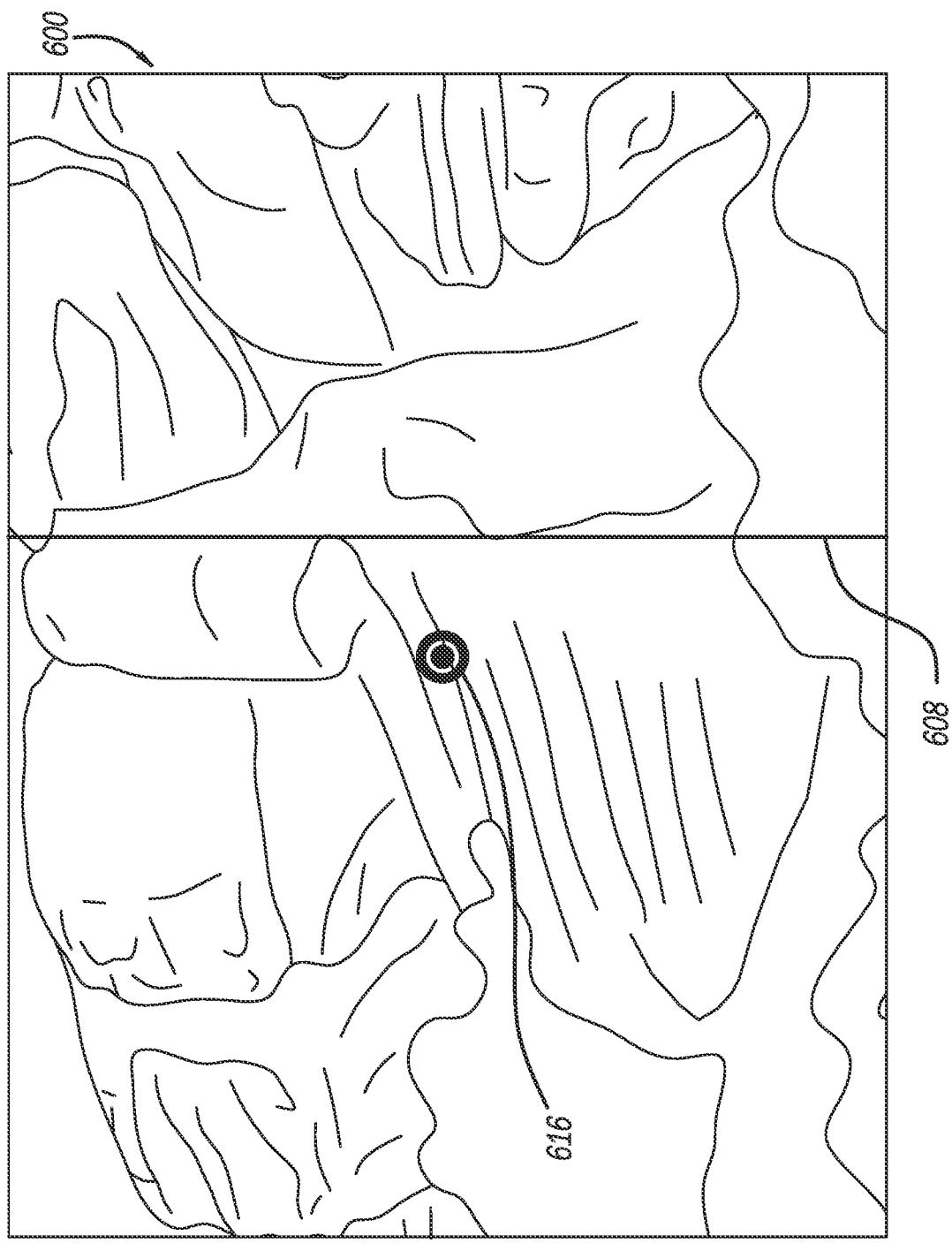
FIG. 10 is a picture of another display of the optical sight in FIG. 1, FIG. 2A, or FIG. 2B.

Referring to FIG. 10, the secondary aiming point 616 may be a second focal plane reticle, similar to reticle 504, that that remains constant as the magnification increases and decreases. The primary aiming point 604 may be a first focal plane reticle, similar to reticle 404, that subtends throughout the magnification range. Alternatively, the primary aiming point 604 and secondary aiming point 616 may both be second focal plane reticles, similar to reticle 504, that that remain constant as the magnification increases and decreases.

Figure 11:
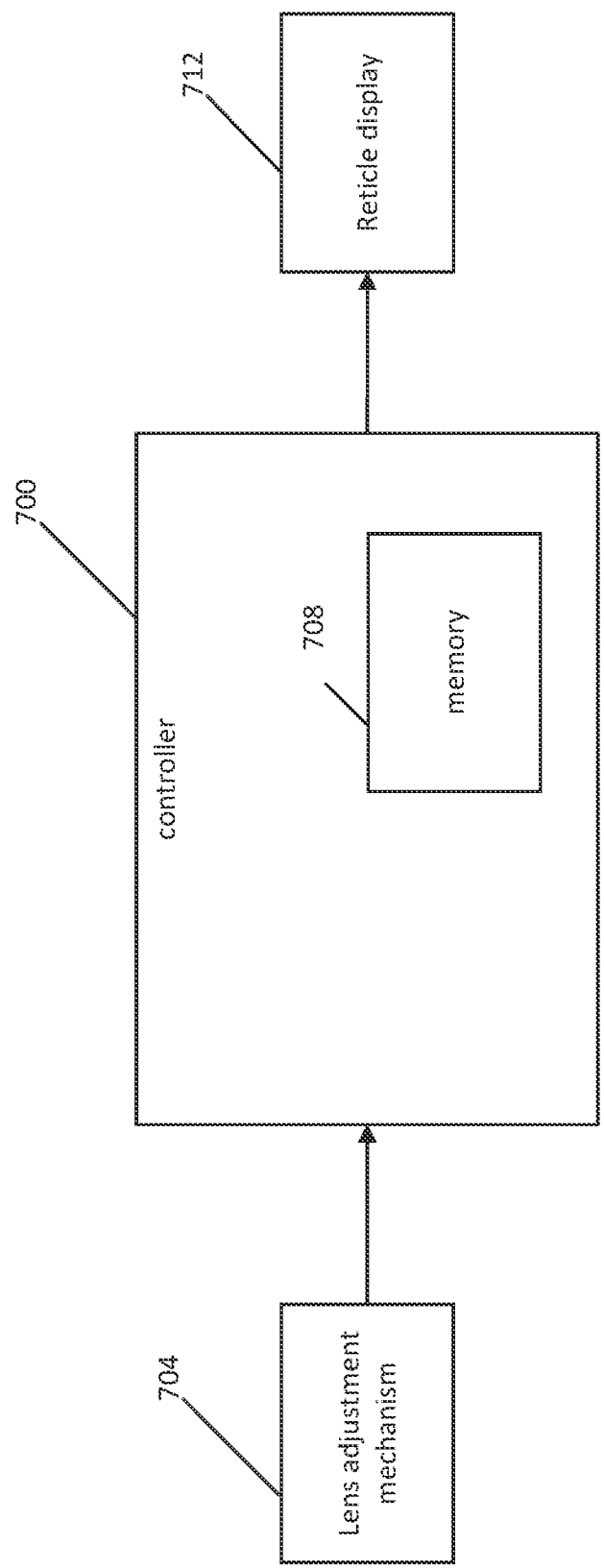
FIG. 11 is a schematic illustration of a control system for the optical sight in FIG. 1, FIG. 2A, or FIG. 2B.

Referring to FIG. 11, the optical sight 10 may include a controller 700 in communication with a lens adjustment mechanism 704. The lens adjustment mechanism 704 may determine an adjustment made by a user to change a magnification of the optical sight 10. The adjustment mechanism 704 may be a sensor that measures movement of the relay assembly 18, a sensor that measures magnification of the camera 34, a sensor that measures rotation of the dial, a sensor that measures rotation of the adjustment ring 30 on the housing 26, a sensor detecting actuation of a user input such as buttons, etc. The adjustment mechanism 704 may provide a position of the adjustment ring 30, a position of the dial, a magnification of the camera 34, or a user input.

The controller 700 may be a control module or control circuit including a memory 708 and programming for executing the functions described herein. The controller 700 may receive a position of the adjustment mechanism 704 and may determine the real-time magnification. For example, where the lens adjustment mechanism 704 is the adjustment ring 30, the lens adjustment mechanism 704 may send an adjustment position of the lens adjustment mechanism 704 to the controller 700. The controller 700 may correlate the adjustment position with a magnitude according to a stored map or chart (stored in the memory 708). The correlated magnitude is the real-time magnitude.

Once the controller 700 establishes the real-time magnitude, the controller 700 may adjust a reticle size to correlate with the magnitude of the optical sight 10. For example, the controller 700 may correlate the reticle size with the real-time magnitude according to a map or chart stored in the memory 708.

The controller 700 may communicate with a reticle display 712 to display the reticle size determined from the real-time magnitude. The reticle display 712 may illuminate the primary aiming point 604 at the intersection between the primary vertical crosshair 608 and the primary horizontal crosshair 612, may illuminate the secondary aiming point 616, or a combination of these according to the reticle size determined from the real-time magnitude. The reticle display 712 may display a digital reticle on the digital display 38.

For example, the controller 700 may replicate a first focal plane reticle with a second focal plane disturbed reticle. The controller 700 may adjust the digital reticle with the real-time magnitude (i.e., the zoom movement), to make the reticle act like a first focal plane variable power scope.

For example, the controller 700 may control the reticle display 712 to display the primary aiming point 604, the primary vertical crosshair 608, and the primary horizontal crosshair 612 as the first focal plane display 400. The controller 700 may control the primary aiming point 604, the primary vertical crosshair 608, and the primary horizontal crosshair 612 to zoom in or out based on the magnification, such that the primary aiming point 604, the primary vertical crosshair 608, and the primary horizontal crosshair 612 subtend throughout the magnification range.

For example, the controller 700 may control the reticle display 712 to display the secondary aiming point 616 as the first focal plane display 400 and as a first focal plane disturbed reticle. The controller 700 may control the secondary aiming point 616 to zoom in or out based on the magnification, such that the secondary aiming point subtends throughout the magnification range.

Alternatively, the controller 700 may control the reticle display 712 to display the primary aiming point 604, the primary vertical crosshair 608, and the primary horizontal crosshair 612 as the first focal plane display 400, as described above, and to display the secondary aiming point 616 as the second focal plane display 500 and a second focal plane disturbed reticle. The controller 700 may control the secondary aiming point 616 to be constant throughout the magnification range, such that the magnification of the secondary aiming point 616 remains constant as the magnification increases and decreases.

Alternatively, the controller 700 may control the reticle display 712 to display the secondary aiming point 616 as the first focal plane display 400, as previously described, and to display the primary aiming point 604, the primary vertical crosshair 608, and the primary horizontal crosshair 612 as the second focal plane display 500. The controller 700 may control the primary aiming point 604, the primary vertical crosshair 608, and the primary horizontal crosshair 612 to be constant throughout the magnification range, such that the magnification of the primary aiming point 604, the primary vertical crosshair 608, and the primary horizontal crosshair 612 remains constant as the magnification increases and decreases.

Figure 12:
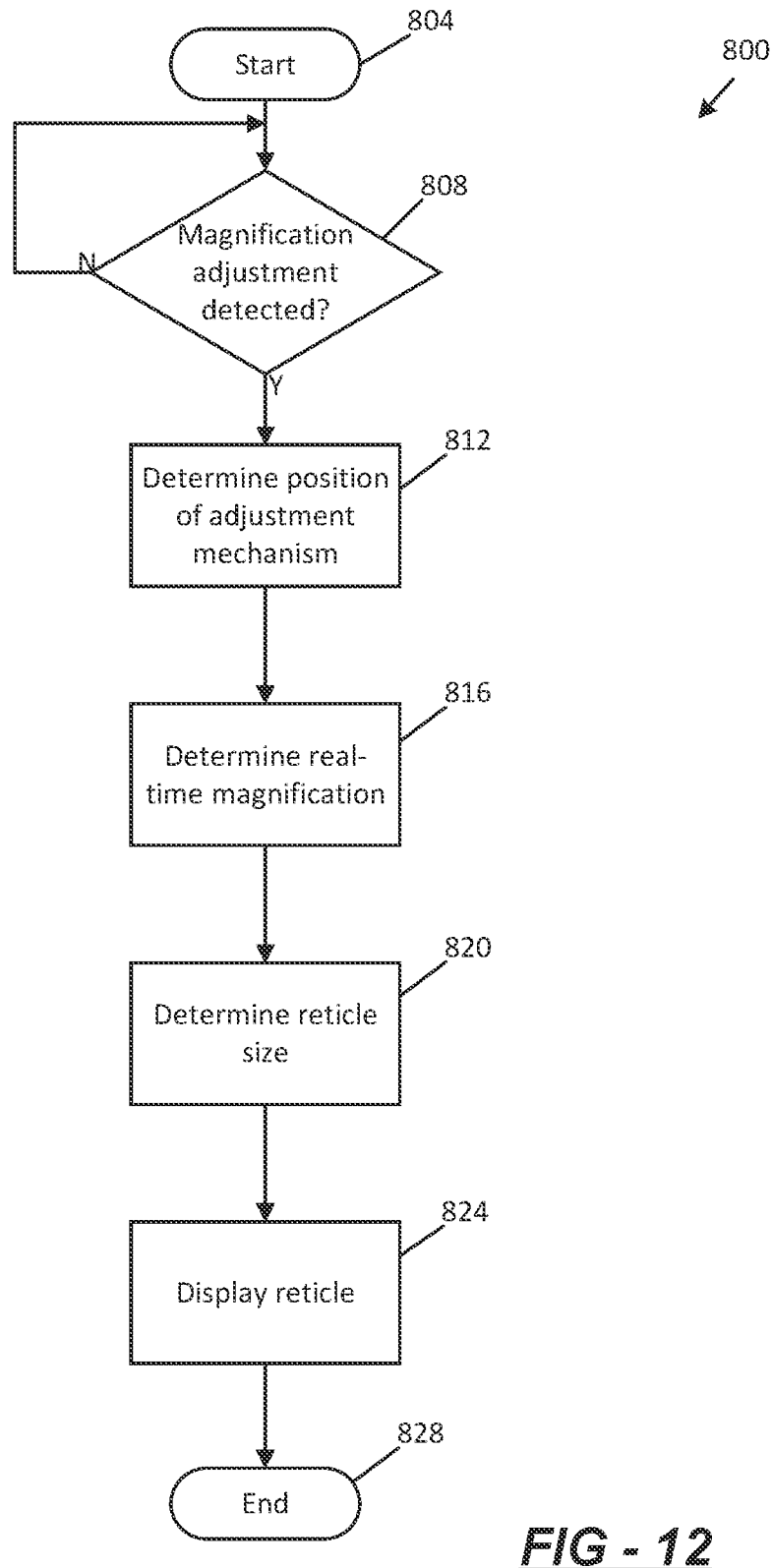
FIG. 12 is a flowchart for a method for displaying a reticle in the optical sight in FIG. 1, FIG. 2A, or FIG. 2B.

Now referring to FIG. 12, a method 800 for displaying a reticle in the optical sight 10 is illustrated. Method 800 starts at 804. At 808, the optical sight 10 determines whether a magnification adjustment is detected. For example, the controller 700 of the optical sight 10 may receive an output from the lens adjustment mechanism 704 to determine an adjustment made by a user to change a magnification of the optical sight 10. For example, the adjustment mechanism 704 may be a sensor, buttons, or another user input that provides a position of the adjustment ring 30, a position of the dial, a magnification of the camera 34, or a user input.

If a magnification adjustment is not detected, method 800 returns to 808. If a magnification adjustment is detected at 808, method 800 moves to 812. A position of the adjustment mechanism 704 is determined at 812. For example, the controller 700 may receive the position of the adjustment mechanism 704. The position of the adjustment mechanism 704 may be in the form of a location of the adjustment ring 30, a location of the dial, a user input, etc.

At 816, a real-time magnification is determined. For example, the controller 700 may determine the real-time magnification from the adjustment position of the adjustment mechanism 704. The real-time magnitude may be determined by correlating the adjustment position with a magnitude according to a stored map or chart.

At 820, the reticle size may be determined. For example, the controller 700 may determine the reticle size from the real-time magnitude. For example, the controller 700 may correlate the reticle size with the real-time magnitude according to a stored map or chart.

At 824 the reticle is displayed. For example, the reticle may be illuminated on the reticle display 712. The reticle display 712 may illuminate the primary aiming point 604 at the intersection between the primary vertical crosshair 608 and the primary horizontal crosshair 612, may illuminate the secondary aiming point 616, or a combination of these according to the reticle size. For example, the reticle display 712 may display a digital reticle on the digital display 38.

For example, the controller 700 may replicate a first focal plane reticle with a second focal plane disturbed reticle. The controller 700 may adjust the digital reticle with the real-time magnitude (i.e., the zoom movement), to make the reticle act like a first focal plane variable power scope.

Method 800 ends at 828.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. In the written description and claims, one or more steps within a method may be executed in a different order (or concurrently) without altering the principles of the present disclosure. Similarly, one or more instructions stored in a non-transitory computer-readable medium may be executed in a different order (or concurrently) without altering the principles of the present disclosure. Unless indicated otherwise, numbering or other labeling of instructions or method steps is done for convenient reference, not to indicate a fixed order.

Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to,"

"on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

The phrase "at least one of A, B, and C" should be construed to mean a logical (A OR B OR C), using a non-exclusive logical OR, and should not be construed to mean "at least one of A, at least one of B, and at least one of C." The term "set" does not necessarily exclude the empty set—in other words, in some circumstances a "set" may have zero elements. The term "non-empty set" may be used to indicate exclusion of the empty set—in other words, a non-empty set will always have one or more elements. The term "subset" does not necessarily require a proper subset. In other words, a "subset" of a first set may be coextensive with (equal to) the first set. Further, the term "subset" does not necessarily exclude the empty set—in some circumstances a "subset" may have zero elements.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" can be replaced with the term "controller" or the term "circuit." In this application, the term "controller" can be replaced with the term "module." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); processor hardware (shared, dedicated, or group) that executes code; memory hardware (shared, dedicated, or group) that stores code executed by the processor hardware; other suitable hardware components that provide the described functionality; or a combination of some or all of the above, such as in a system-on-chip.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2020 (also known as the WIFI wireless networking standard) and IEEE Standard 802.3-2018 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module. For example, the client module may include a native or web application executing on a client device and in network communication with the server module.

Some or all hardware features of a module may be defined using a language for hardware description, such as IEEE Standard 1364-2005 (commonly called "Verilog") and IEEE Standard 1076-2008 (commonly called "VHDL"). The hardware description language may be used to manufacture and/or program a hardware circuit. In some implementations, some or all features of a module may be defined by a language, such as IEEE 1666-2005 (commonly called "SystemC"), that encompasses both code, as described below, and hardware description.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

The memory hardware may also store data together with or separate from the code. Shared memory hardware encompasses a single memory device that stores some or all code from multiple modules. One example of shared memory hardware may be level 1 cache on or near a microprocessor die, which may store code from multiple modules. Another example of shared memory hardware may be persistent storage, such as a solid state drive (SSD), which may store code from multiple modules. Group memory hardware encompasses a memory device that, in combination with other memory devices, stores some or all code from one or more modules. One example of group memory hardware is a storage area network (SAN), which may store code of a particular module across multiple physical devices. Another example of group memory hardware is random access memory of each of a set of servers that, in combination, store code of a particular module.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. Such apparatuses and methods may be described as computerized apparatuses and computerized methods. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A method of adjusting a reticle display comprising:
    detecting, by a controller, movement of a magnification adjuster;
    determining, by the controller, a real-time magnification from the detecting the movement of the magnification adjuster;
    determining, by the controller, a magnification of a reticle based on the real-time magnification, the reticle including a primary aiming point and a secondary aiming point;
    calculating, with the controller, range and ballistic drop based on the primary aiming point;
    after the calculating, displaying the secondary aiming point of the reticle on a digital display; and
    estimating, with the controller, an impact point based on the range and ballistic drop, wherein the secondary aiming point indicates the impact point.

2. The method of claim 1, further comprising controlling, by the controller, a magnification of the secondary aiming point to remain constant.

3. The method of claim 1, further comprising controlling, by the controller, a magnification of the secondary aiming point to correspond to the real-time magnification.

4. The method of claim 3, wherein the controlling a magnification of the secondary aiming point includes correlating, with a controller, the magnification of the secondary aiming point with the real-time magnification using a map or chart stored in a memory.

5. The method of claim 1, wherein the magnification adjuster is an adjustment ring, at least one button, or a dial.

6. The method of claim 1, wherein the determining the real-time magnification includes determining a real-time position of the magnification adjuster and determining the real-time magnification based on the real-time position of the magnification adjuster.

7. The method of claim 6, wherein
    the magnification adjuster includes a dial, and
    the determining the real-time position includes sensing, with a sensor, rotation of the dial.

8. The method of claim 6, wherein
    the magnification adjuster includes an adjustment ring, and
    the determining the real-time position includes sensing, with a sensor, rotation of the adjustment ring.

9. The method of claim 6, wherein
    the magnification adjuster includes a button, and
    the determining the real-time position includes sensing, with a sensor, actuation of a button.

10. The method of claim 6, wherein the determining the real-time magnification based on the real-time position of the magnification adjuster includes correlating, with the controller, the magnification with the real-time position of the magnification adjuster using a map or chart stored in a memory.

11. The method of claim 1, wherein the determining the real-time magnification includes sensing, with a sensor, magnification of a camera.

12. The method of claim 1, wherein the determining the real-time magnification includes sensing, with a sensor, movement of a relay assembly.

13. The method of claim 1, further comprising controlling, by the controller, a magnification of the primary aiming point to correspond to the real-time magnification.

14. The method of claim 13, further comprising controlling, by the controller, a magnification of the secondary aiming point to remain constant.

15. The method of claim 13, further comprising controlling, by the controller, a magnification of the secondary aiming point to correspond to the real-time magnification.

16. The method of claim 1, further comprising controlling, by the controller, a magnification of the primary aiming point to remain constant.

17. The method of claim 16, further comprising controlling, by the controller, a magnification of the secondary aiming point to remain constant.

18. The method of claim 16, further comprising controlling, by the controller, a magnification of the secondary aiming point to correspond to the real-time magnification.

19. The method of claim 1, wherein the primary aiming point includes a horizontal crosshair and a vertical crosshair and the secondary aiming point is a circular aiming point.

* * * * *